(12) United States Patent
Coffman et al.

(10) Patent No.: US 7,031,448 B2
(45) Date of Patent: Apr. 18, 2006

(54) SELECTABLE MUTING ON CONFERENCE CALLS

(75) Inventors: James E. Coffman, Boulder, CO (US); Brenda Anne Duran, Thornton, CO (US); Alan Stuart Mulberg, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 514 days.

(21) Appl. No.: 10/042,577

(22) Filed: Jan. 9, 2002

(65) Prior Publication Data
US 2003/0128830 A1    Jul. 10, 2003

(51) Int. Cl.
*H04M 3/42*    (2006.01)
(52) U.S. Cl. ............................. 379/202.01; 379/93.21; 379/158
(58) Field of Classification Search ............. 379/93.21, 379/93.23, 156, 158, 202.01, 207.01, 421
See application file for complete search history.

(56) References Cited

U.S. PATENT DOCUMENTS

| | | | |
|---|---|---|---|
| 5,195,086 A * | 3/1993 | Baumgartner et al. ...... | 370/264 |
| 5,369,694 A | 11/1994 | Bales | |
| 5,373,549 A | 12/1994 | Bales | |
| 5,473,367 A | 12/1995 | Bales | |
| 5,475,747 A | 12/1995 | Bales | |
| 5,590,127 A | 12/1996 | Bales | |
| 5,619,561 A * | 4/1997 | Reese ..................... | 379/142.08 |
| 5,729,532 A | 3/1998 | Bales | |
| 6,453,022 B1 * | 9/2002 | Weinman, Jr. ........... | 379/88.13 |
| 6,768,722 B1 * | 7/2004 | Katseff et al. .............. | 370/260 |

* cited by examiner

*Primary Examiner*—Bing Q. Bui
(74) *Attorney, Agent, or Firm*—John C. Moran

(57) ABSTRACT

During a conference call, identifying a communication terminal, and inhibiting transmission of audio signals to the conference call by the identified communication terminal in response to operations performed by another communication terminal.

10 Claims, 3 Drawing Sheets

SELECTABLE MUTING ON CONFERENCE CALLS

TECHNICAL FIELD

This invention relates to telephones in general, and in particular, to the capability of controlling conference calls.

BACKGROUND OF THE INVENTION

Within the prior art, conference calls are well known. The problem that can arise during a conference call is that one of the parties to the conference call may be performing an act or their telephone may be performing an act that is disrupting the conference call. One such situation is when a party puts the call on hold and music-on-hold is active. The rest of the parties of the conference call have a difficult time communicating over the music until the person reenters the conference call and removes the call on hold feature. Another situation is when a user is on a cellular telephone which is generating noise. The cellular telephone user may not be aware that the cellular telephone is even causing a problem for others on the conference call or may not be able to mute their cellular phone because of environmental conditions or because the phone does not have this capability. In these types of situations, all of the parties to the conference call experience degradation in the quality of the communications.

SUMMARY OF THE INVENTION

This invention is directed to solving these and other problems and disadvantages of the prior art. According to an embodiment of the invention, a user to the conference call can identify a party that is disrupting the conference call and inhibit the transmission of audio signals from the identified party. Advantageously, only a simple digital telephone station with an alphanumeric display is required to perform these activities. Advantageously, the user of the telephone that is disrupting the conference call still can hear the telephone call; and if they wish to reenter the conference call, they can press a key on their telephone which will send a multi-frequency tone that enables them to speak on the conference call.

These and other advantages and features of the present invention will become apparent from the following description of an illustrative embodiment of the invention taken together with the drawing.

DETAILED DESCRIPTION

Figure 1:
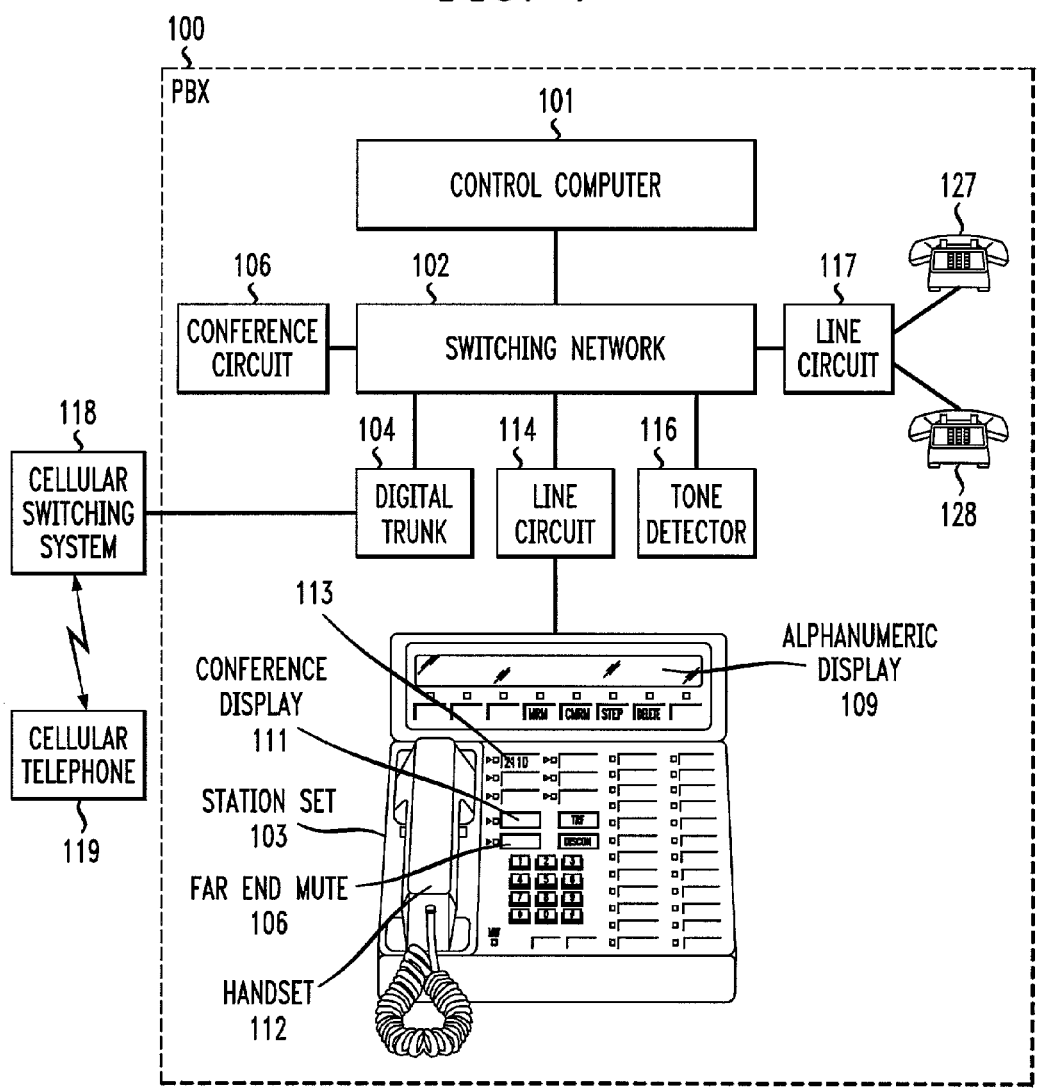
FIG. 1 illustrates, in block diagram form, an embodiment of a telecommunication system utilizing the present invention.

FIG. 1 illustrates an embodiment of a system for implementing the invention. PBX 100 (also referred to as an enterprise communication switching system or a business communication switching system) is illustrated as having a number of telephones interconnected to switching network 102 via line circuits 114 and 117. In addition, PBX 100 is interconnected to cellular switching system 118 via digital trunk 104. One skilled in the art would realize that the interconnection to cellular switching system 118 could well be through the public telephone network. In addition, PBX 100 could interconnect to telephones connected to the public switching system. Cellular telephone 119 is in communication with cellular switching system 118. In addition, PBX 100 has a conference circuit 106 and tone detector 116. Both of these circuits are well known to those skilled in the art.

To better understand the operation of PBX 100 with respect to conference calls, consider the following example. Station set 103, station set 127, and station set 128 are engaged in a conference call with cellular telephone 119. The conference call is enabled by conference circuit 106 under control of control computer 101. Switching network 102 provides the necessary paths between the participating telephones on the conference call and conference circuit 106. Assume, that cellular telephone 119 is at a distance from cellular switching system 118 and the radio communication between cellular telephone 119 and cellular switching system 118 is disrupted on a periodic basis. This causes interference with the conference call because of noise being transmitted to the conference call from cellular switching system 118. In response to cellular telephone 119 disrupting the conference call, the user of station set 103 presses button 111 which is the "conference display" button. Each time the user presses button 111, another participant in the conference call is displayed by name and telephone number on alphanumeric display 109. When information for cellular telephone 119 is displayed on alphanumeric display 109, the user of station set 103 activates button 108 which is the "far end mute" button. Control computer 101 is responsive to this actuation to transmit control messages to conference circuit 106 to inhibit the audio samples being received from cellular telephone 119 from being part of the conference call. In addition, control computer 101 enables a tone detector 116 to receive the audio samples from cellular telephone 119 via switching network 102. If the user of cellular telephone 119 wants to speak on the conference call again, the user of cellular telephone 119 presses the "#" key. Tone detector 116 is responsive to the actuation of the "#" key to transmit a control message to control computer 101. In response, control computer 101 transmits a control message to conference circuit 106 to enable the audio samples being received from cellular telephone 119 to once again be part of the conference call. In addition, control computer 101 removes tone detector 116 from monitoring the audio samples from cellular telephone 119 by controlling switching network 102.

In this example, the users of station sets 103, 127, and 128 can also unmute cellular telephone 119. To unmute cellular telephone 119, the user of station set 103 again presses button 111 until the name and telephone number for cellular telephone 119 are displayed on alphanumeric display 109. When the information for cellular telephone 119 is displayed on alphanumeric display 109, the user of station set 103 again activates button 108 which is the "far end mute" button. Control computer 101 is responsive to this second actuation to transmit control messages to conference circuit 106 to again make cellular telephone 119 part of the conference call. In addition, control computer 101 disables tone detector 116.

Figure 2:
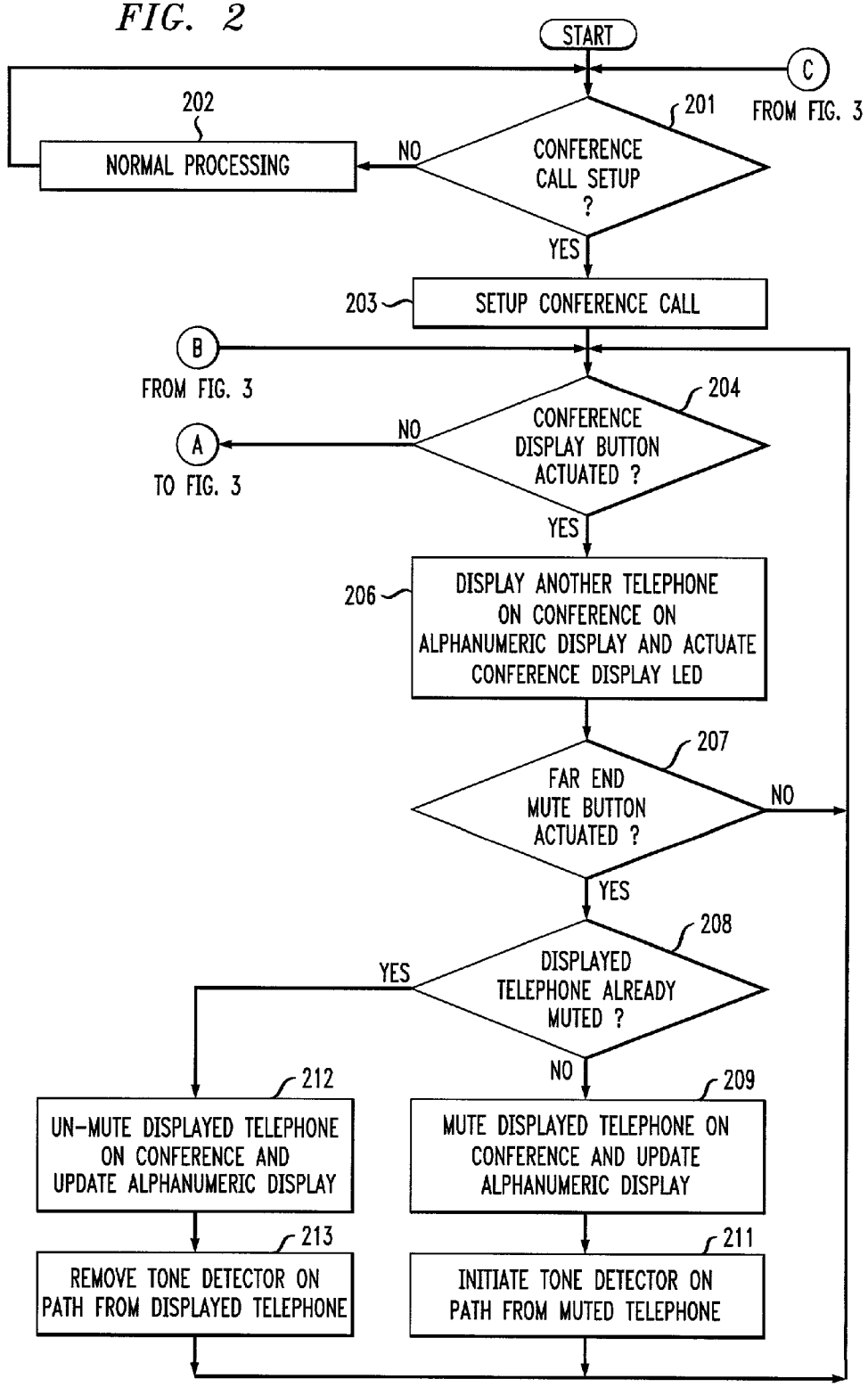
FIGS. 2 and 3 illustrate, in flowchart form, the steps performed by the control computer in implementing an embodiment of the invention.
Figure 3:
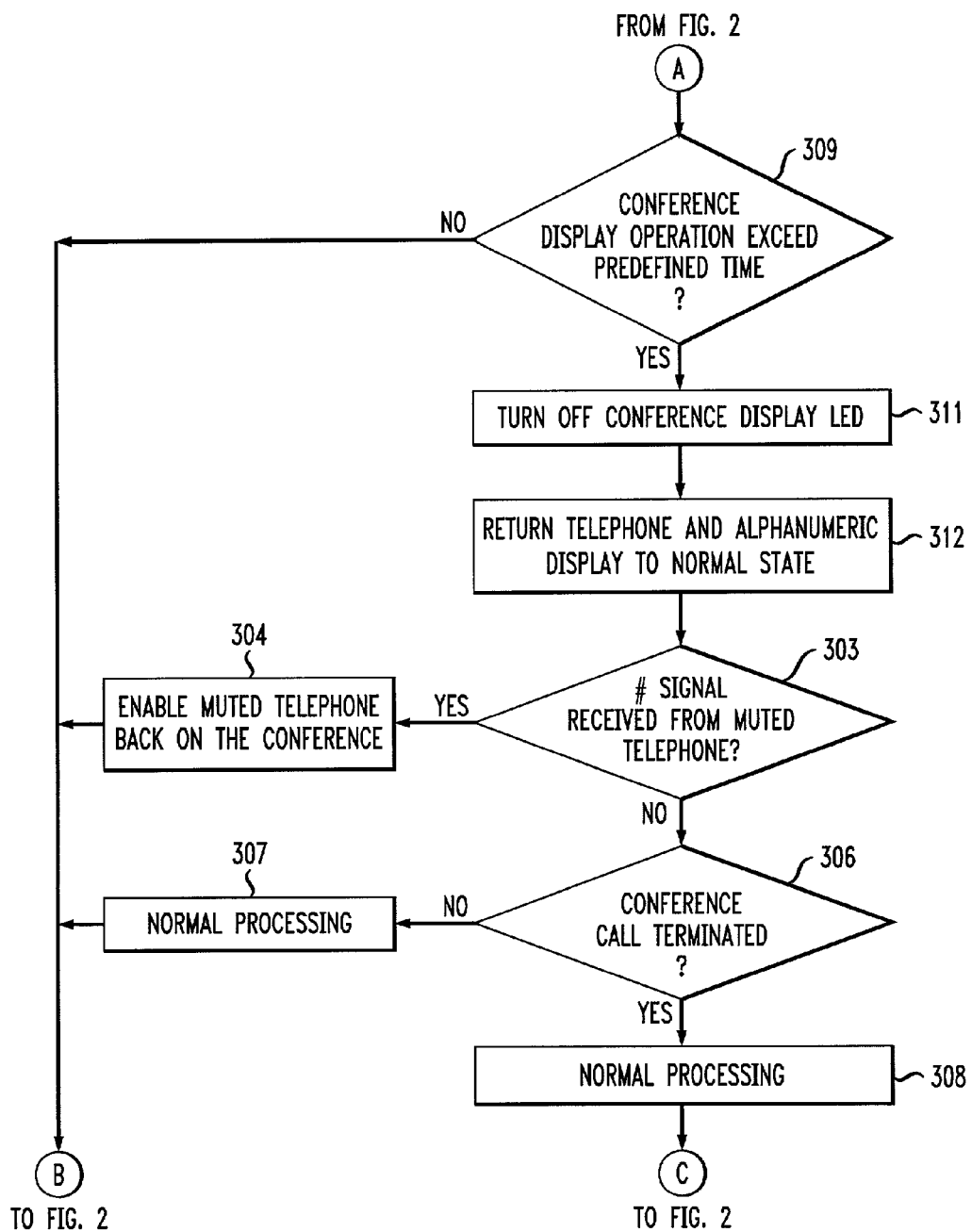

FIGS. 2 and 3 illustrate, in flow chart form, the steps performed by control computer 101 in implementing one embodiment of the invention. After being started, decision block 201 checks to see if a conference call is being set up. A conference call would be set up in a manner well known to those skilled in the art. If the answer is no, control is transferred to block 202 that performs normal processing before returning call control back to decision block 201. If the answer is yes in decision block 201, block 203 sets up the conference call before transferring control to decision block 204. Decision block 204 determines if the "conference display" button has been actuated on any of the telephones that are part of the conference call. If the answer is yes, control is transferred to block 206 which displays another telephone on the conference to the telephone that actuated the "conference display" button. Note, that the functions of block 206 are to take the other telephones on the conference sequentially in some manner so that all of them are displayed in response to each actuation of the "conference display" button. After execution of block 206, decision block 207 determines if the "far end mute" button has been actuated on the telephone that actuated the "conference display" button. If the answer is no, control is transferred back to decision block 204 to once again determine if the user has actuated the conference display button. The user repeatedly activates the conference display button so as to step through all of the telephones on the conference call.

Returning to decision block 207, if the "far end mute" button has been actuated on the telephone whose "conference display" button is actuated, control is transferred to decision block 208 of FIG. 2. Decision block 208 determines if the displayed telephone is already marked as being muted. If the answer is no, control is transferred to block 209. Block 209 mutes the displayed telephone on the conference so that the displayed telephone can no longer input audio information into the conference. Then, block 211 initiates a tone detector on the path from the muted telephone. One skilled in the art can readily see that the signaling from the muted telephone could be other than multi-frequency tones and that block 211 could be suitably adjusted to handle these other kinds of signals. After execution of block 211, control is transferred back to decision block 204 of FIG. 2. Returning to decision block 208, if the answer in decision block 208 is that the telephone has already been muted, control is transferred to block 212 which unmutes the displayed telephone on the conference. This unmuting know allows the displayed telephone to speak on the conference call. Next, block 213 removes the tone detector from monitoring the displayed telephone before returning control back to decision block 204.

Returning to decision block 204, if the answer is no that the "conference display" button has not been actuated on any of the telephones that are party to the conference, control is transferred to decision block 309 of FIG. 3. Decision block 309 determines whether the conference display operation has exceeded a predefined time. Advantageously, this predefined time may be 60 seconds. Once the user has actuated the conference display button, the user has 60 seconds to proceed with the operations of displaying the next conference member or muting the currently displayed telephone telephone. If the user fails to perform any additional operations, control is transferred from decision block 309 to block 311. However, if the decision is made in decision block 309 that the predefined amount of time has not been exceeded, control is transferred back to decision block 204 of FIG. 2. If the decision is made in decision block 309 that the predefined time has been exceeded, control is transferred to block 311. Block 311 turns off the conference display LED, and block 312 returns the telephone that had actuated the conference display button to the normal state before transferring control to decision block 303.

The decision block 303 determines if the "#" has been actuated on the muted telephone. If the answer is yes, control is transferred to block 304 which enables the muted telephone back on the conference before transferring control back to decision block 204. If the answer in decision block 303 is no, control is transferred to decision block 306. Decision block 306 determines if the conference call has been terminated in a manner well known to those skilled in the art. If the answer is no that the conference call has not been terminated, block 307 performs normal processing before transferring control back to decision block 204 of FIG. 2. If the conference call has been terminated, block 308 performs normal processing before returning control back to decision block 201 of FIG. 2.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for controlling a conference call of a plurality of communication terminals, comprising the steps of:

displaying on a first one of the plurality of communication terminals an identity of a second one of the plurality of communication terminals in response to a first signal from the first one of the plurality of communication terminals;

disabling audio information received from the second one of the plurality of communication terminals on the conference call in response to a second signal from the first one of the plurality of communication terminals;

re-enabling the audio information received from the second one of the plurality of communication terminals on the conference call in response to one of a third signal from the second one of the plurality of communication terminals after the audio information from the second one of the plurality of communication terminals had previously been disabled by the second signal or a fourth signal from a third one of the plurality of communication terminals after the audio information from the second one of the plurality of communication terminals had previously been disabled by the second signal.

2. The method of claim 1 wherein the step of disabling comprises the step of re-enabling the second one of the plurality of communication terminals on the conference call in response to another second signal from the first one of the plurality of communication terminals while the identity of the second one of the plurality of communication terminals is displayed on the first one of the plurality of communication terminals.

3. The method of claim 1 wherein the step of displaying on the first one of the plurality of communication terminals comprises the step of displaying a third one of the plurality of communication terminals in response to another first signal from the one of the plurality of communication terminals.

4. The method of claim 3 wherein the step of disabling comprises the step of disabling audio information received from the third one of the plurality of communication terminals on the conference call in response to another second signal from the first one of the plurality of communication terminals while the identity of third one of the plurality of communication terminals is displayed on the first one of the plurality of communication terminals.

5. The method of claim 4 wherein the step of re-enabling comprises re-enable the audio information from the third one of the plurality of communication terminals received from the second one of the plurality of communication terminals on the conference call in response to another third signal from the third one of the plurality of communication terminals.

6. A system for controlling a conference call comprising:
a telecommunication switching system;
a conference circuit;
a plurality of communication terminals communicating a with each other via the conference circuit;
the telecommunication switching system responsive to a first actuation of a first button on a first one of the plurality of communication terminals for displaying an identity of a second one of the plurality of communication terminals on a display of the first one of the plurality of communication terminals;
the telecommunication switching system further responsive to first actuation of a second button on the first one of the plurality of communication terminals for transmifting a first signal to the conference circuit;
the conference circuit responsive to the first signal for inhibiting audio information from the second one of the plurality of communication terminals that is displayed on the display of the first one of the plurality of communication terminals from being communicated to the other ones of the plurality of communication terminals;
the telecommunication switching system further responsive to a first actuation of a first button on a third one of the plurality of communication terminals for displaying an identity of the second one of the plurality of communication terminals on a display of the third one of the plurality of communication terminals;
the telecommunication switching system further responsive to first actuation of a second button on the third one of the plurality of communication terminals for transmitting a third signal to the conference circuit; and
the conference circuit responsive to the third signal for allowing audio information from the second one of the plurality of communication terminals to be communicated again to the other ones of the plurality of communication terminals after the audio information had been previously inhibited from the second one of the plurality of communication terminals by the first signal.

7. The system of claim 6 wherein in telecommunication switching system further responsive to another actuation of the second button on the first one of the plurality of communication terminals while the identity of the second one of the plurality of communication terminals is displayed on the display of the first one of the plurality of communication terminals for transmitting another third signal to the conference circuit; and
the conference circuit responsive to the other third signal for allowing audio information from the second one of the plurality of communication terminals to be communicated to the other ones of the plurality of communication terminals.

8. The system of claim 6 wherein the telecommunication switching system further responsive to a second actuation of the first button on the first one of the plurality of communication terminals for displaying an identity of a third one of the plurality of communication terminals on a display of the first one of the plurality of communication terminals.

9. The system of claim 8 wherein the telecommunication switching system further responsive to a second actuation of the second button on the first one of the plurality of communication terminals for transmitting another first signal to the conference circuit; and
the conference circuit responsive to the other first signal for inhibiting audio information from the third one of the plurality of communication terminals that is displayed on the display of the first one of the plurality of communication terminals from being communicated to the other ones of the plurality of communication terminals.

10. The system of claim 9 wherein the telecommunication switching system further responsive to a third actuation of the second button on the first one of the plurality of communication terminals while the identity of the third one of the plurality of communication terminals is displayed on the display of the first one of the plurality of communication terminals for transmitting another third signal to the conference circuit; and
the conference circuit responsive to the other third signal for allowing audio information from the third one of the plurality of communication terminals to be communicated to the other ones of the plurality of communication terminals.

* * * * *